(12) United States Patent
Ivory et al.

(10) Patent No.: US 8,298,059 B2
(45) Date of Patent: Oct. 30, 2012

(54) METHOD, SYSTEM AND COMPUTER PROGRAM PRODUCT FOR CREATING CUSTOM TUTORIALS BASED ON INTERACTIVE GAMEPLAY

(75) Inventors: Andrew Ivory, Wake Forest, NC (US); Barry Joseph Pellas, Durham, NC (US); Matthew Thomas Pellas, Raliegh, NC (US); Matthew Kevin Thomas, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 12/797,242

(22) Filed: Jun. 9, 2010

(65) Prior Publication Data

US 2011/0306395 A1    Dec. 15, 2011

(51) Int. Cl.
*A63F 9/24* (2006.01)
*A63F 13/00* (2006.01)
*G06F 17/00* (2006.01)
*G06F 19/00* (2006.01)

(52) U.S. Cl. ............................................. 463/1; 463/4

(58) Field of Classification Search .................... 463/1, 4
See application file for complete search history.

(56) References Cited

U.S. PATENT DOCUMENTS

| | | |
|---|---|---|
| 5,035,625 A | 7/1991 | Munson et al. |
| 5,261,820 A | 11/1993 | Slye et al. |
| 5,535,422 A | 7/1996 | Chiang et al. |
| 5,558,339 A | 9/1996 | Perlman |
| 6,699,127 B1 | 3/2004 | Lobb et al. |
| 7,587,637 B2 | 9/2009 | Garakani |
| 2008/0119272 A1 | 5/2008 | Zalewski |
| 2008/0214273 A1* | 9/2008 | Snoddy et al. .................. 463/19 |

* cited by examiner

*Primary Examiner* — William M. Brewster
(74) *Attorney, Agent, or Firm* — Steven E. Bach

(57) ABSTRACT

The present invention provides a method, system, and program product for creating a custom tutorial comprising the controller inputs associated with the controller manipulations that cause an action observed by a player during game play. Controller inputs are saved during game play. In response to a first player performing an action to create a tutorial, controller inputs from a tagged player are captured. A custom tutorial is created for performing game actions performed by the tagged player's avatar comprising the captured controller inputs. The tutorial is sent to a memory device accessible by the first player.

18 Claims, 3 Drawing Sheets

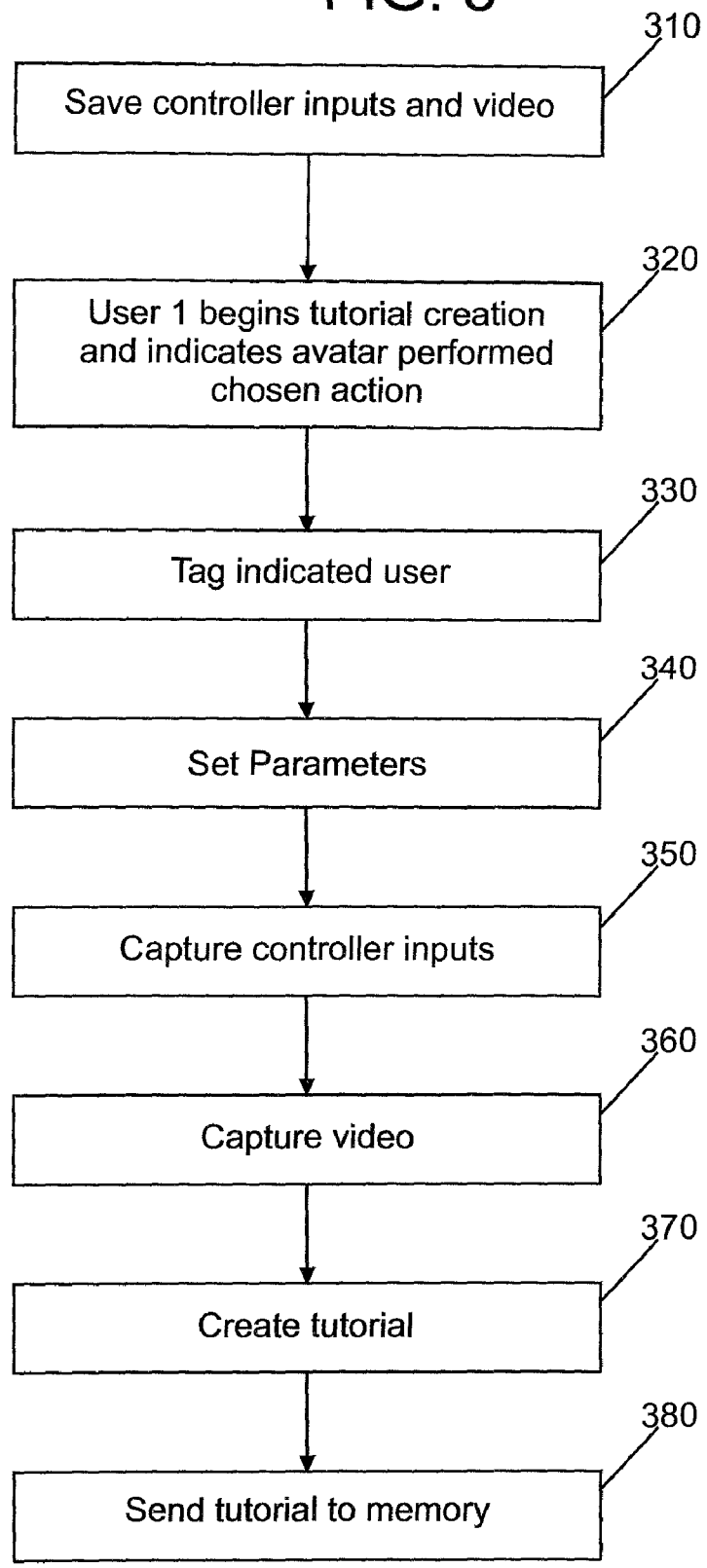

METHOD, SYSTEM AND COMPUTER PROGRAM PRODUCT FOR CREATING CUSTOM TUTORIALS BASED ON INTERACTIVE GAMEPLAY

FIELD OF THE INVENTION

The invention relates to the field of video games and more particularly to a method, system and computer program product for enabling a player to create a custom tutorial based on actual game play.

BACKGROUND

Video games have become increasingly popular over time. One area of video games that is rapidly increasing in popularity is interactive on-line gaming, in which multiple game players at different locations play interactively over a network, such as the Internet. Different game players, each at their own console or station, connect through a network server to play in real time and interactively.

In video games, the players dictate the movements and actions of their virtual selves, called avatars, in a virtual environment by combinations of controls on a controller. The controls may include joysticks, buttons, and motion of the controller, itself, such as tilting, raising, twisting, and the like. The player manipulates the controls to create a controller input which is transmitted to the player's console.

In interactive on-line games, the controller inputs are transmitted over a network to a game server which receives controller inputs from a plurality of players and resolves action between players' avatars and other players' avatars, as well as features of the game such as non-character players (NCPs), forces acting on the avatars such as gravity, and objects and obstacles in the game, and the like. The resolved actions are transmitted back to the consoles, which create a video of the action from the player's avatar's perspective and present the video at a monitor connected to the console.

In many video games, including those for which interactive on-line play is available, increasing numbers of actions are available, requiring a large number of combinations of manipulations. Moreover, increasingly complex actions are available, requiring increasingly complex controller manipulations, many times requiring multiple manipulations performed either simultaneously or in a specific sequence. Also, certain game situations may require combinations of controller manipulation unique to the game situation or location. Often during interactive on-line game play a player will see a more advanced player's avatar perform an action and wonder how to accomplish the action.

Currently, a video game player who wants to know how another player has performed an action can try to ask the other player. However, the player who wants the information may not know the other player, or the other player may not be interested in making the effort to share the information. The time required to try to learn all of the complex controller manipulations for a myriad of actions may lead to frustration for inexperienced game players.

A video game player may also perform a combination of multiple controller manipulations that the player believes are unrelated to each other during video game play that yield an unexpected result, because the player has inadvertently performed a combination with a defined result of which the player was unaware. While the player may want to understand the combination of manipulations that lead to the unexpected result, the player may not be able to recall or determine the exact combination of controller manipulations required, leading to frustration.

SUMMARY

It is advantageous for a video game player to have the ability to create his/her own custom tutorials to learn the controller manipulations that perform actions that the player sees performed during game play by his/her own avatar or the avatar of another player. According to embodiments of the present invention a method, system, and program product are provided for creating a custom tutorial comprising the controller inputs associated with the controller manipulations that cause an action observed by a player during game play.

According to an embodiment of the present invention a method is provided for creating a custom tutorial for a video game. The method comprises saving controller inputs and resulting video during game play; in response to a first player performing an action to create a tutorial, capturing controller inputs from a tagged player; creating a custom tutorial for performing game actions performed by the tagged player's avatar comprising the captured controller inputs; and sending the custom tutorial to a memory device accessible by the first player. The game play may comprise playing an interactive video game with other players over a network, or it may comprise playing on a local console.

According to various embodiments the first player may indicate a player to be tagged. The tagged player may be either the first player or another player.

According to various embodiments the method also comprise capturing a video of game action from the tagged player's perspective, the step of creating a custom tutorial further comprise synchronizing the controller inputs and the game action video, and the custom tutorial comprises the controller inputs and the video.

According to various embodiments the controller inputs are saved by placing them in a cache which holds the controller inputs for a rolling period of time. The custom tutorial further comprises specifying a period of time prior to the action to create the tutorial to include in the tutorial.

According to another embodiment of the present invention a system for creating a custom tutorial for a video game is provided. The system comprises: a controller having controls, the controller sending controller inputs to a processor in response to manipulation of the controls; a processor operably connected to the controller processing controller inputs and game features into game action and creating video of the game action; a memory operably connected to the processor storing controller inputs; and a memory having a tutorial application encoded thereon, the tutorial application capturing controller input during game play for a tagged game player and creating a tutorial comprising the captured controller inputs in response to an action by a first game player. The processor may be disposed in a game console or in a game server connected with a plurality of game consoles for interactive on-line game play. The tutorial application may enable the first game player to select the tagged game player, who may be the first player or another player. The tutorial application may capture video of game action and the tutorial may comprise the captured video. The tutorial application may enable the first player to select a period of time prior to the action to create the tutorial to include in the tutorial.

According to another embodiment of the present invention a computer program product is provided comprising a computer readable storage medium having encoded thereon a program of instructions, comprising: program instructions for saving controller inputs and resulting video during game play; program instructions for capturing controller inputs from a tagged player in response to a first player performing an action to create a tutorial; program instructions for creating a custom tutorial for performing game actions performed by the tagged player's avatar comprising the captured controller inputs; and program instructions for sending the custom tutorial to a memory device accessible by the first player. The program of instructions may further comprise program instructions enabling the first player to tag a player participating in a video game. The tagged player may be the first player, or the tagged player may be a player who is not the first player. The program of instructions may further comprise program instructions for capturing video corresponding to the captured controller inputs and wherein the tutorial comprises the captured video. The program of instruction may further comprise program instructions for specifying a period of time prior to the action to create the tutorial to include in the tutorial.

BRIEF DESCRIPTION OF THE DRAWINGS

The features and advantages of the invention will be more clearly understood from the following detailed description of the preferred embodiments when read in connection with the accompanying drawing. Included in the drawing are the following figures:

FIG. 3 is a flow diagram of a method at a game server for creating a custom tutorial for an interactive, multi-player game according to an embodiment of the present invention.

DETAILED DESCRIPTION

The present invention provides a method, apparatus and program product for creating a custom tutorial for an interactive, multi-player game. During interactive, on-line game play, if a first player sees another second player perform an action that the first player would like to learn, the first player may choose to create a custom tutorial to learn the action. The tutorial comprises the controller inputs from the second player. The tutorial may further comprise video from the second player's perspective or the second player's avatar's perspective.

Figure 1:
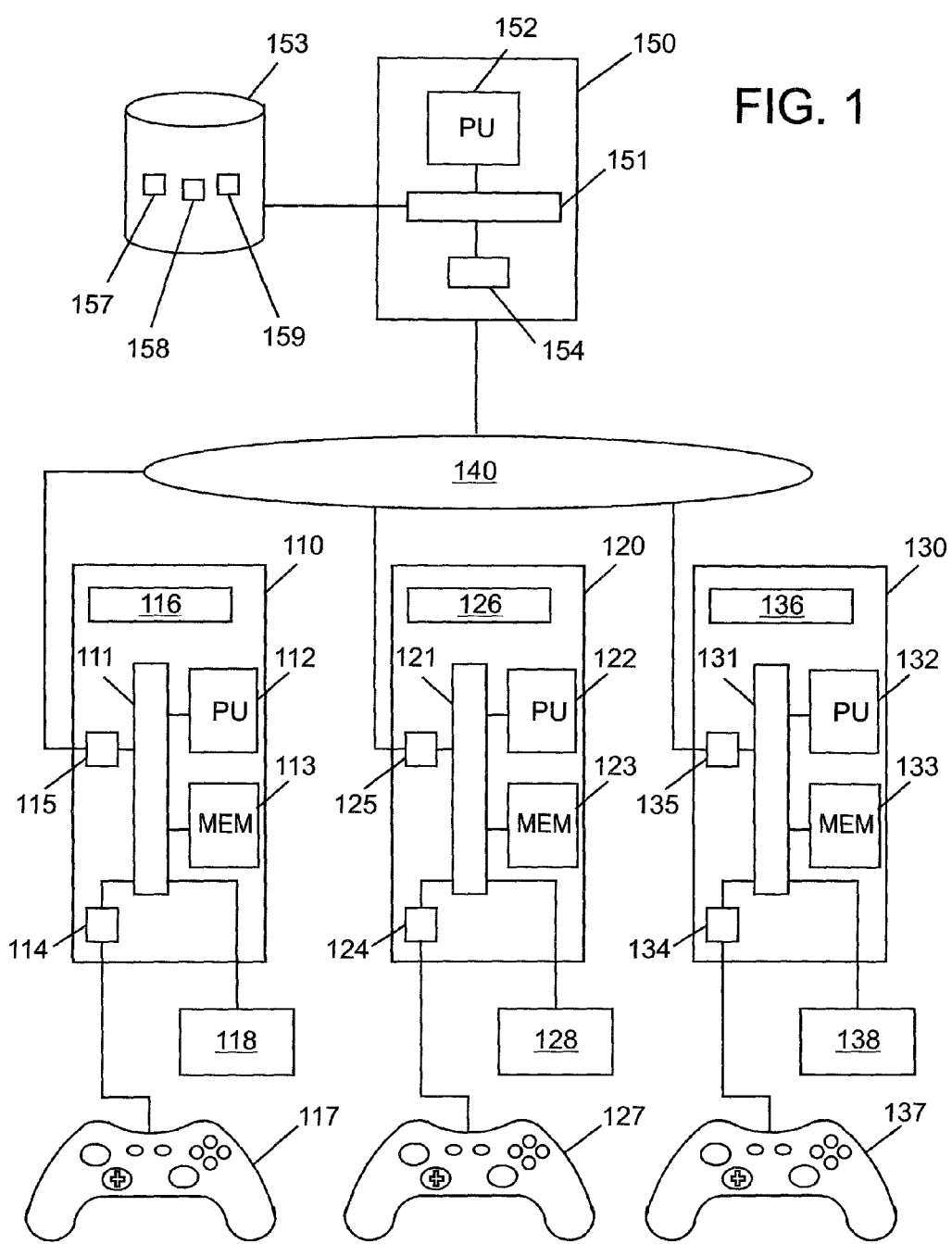
FIG. 1 is a block diagram of a plurality of gaming consoles connected to a game server for interactive play, the game server configured to capture controller input from another player according to an embodiment of the present invention.

FIG. 1 is a block diagram of a game system set up for interactive multi-player gaming and for creating custom tutorials according to an embodiment of the present invention. Each player has a game console 110, 120, 130. The game console may be a game platform, a personal computer, or another electronic device configured for game play. The game console comprises a processing unit 112 for processing controller inputs and game features, resolving actions, and generating video of the game action. The processing unit 112 may be any suitable hardware, software, or combination thereof. According to one embodiment, the processing unit comprises one or more microprocessors.

A memory 113 is connected with the processing unit 112 through a bus 111. Memory 113 may comprise Random access Memory (RAM), persistent memory, such as a hard drive, a CD-ROM, a DVD drive, a USB memory device, or the like, or a combination thereof.

A game drive 116 is connected with the processing unit 112 through the bus 111. The game drive 116 may be a hard drive with a game loaded on it or a memory drive configured to receive a game disc or other memory device with a game encoded thereon. The game drive provides game features to the processing unit 112. Game features may include, but are not limited to: the appearance, location, and behavior of a game environment, appearance of a player's avatar, rules for interaction between the player's avatar and the game features, and rules for interpretation of controller inputs.

A controller interface 114 is also connected with the processing unit 112 through the bus 111. The controller interface 114 receives controller inputs in the form of electromagnetic signals from a controller 117, and transmits them through the bus 11 to the processing unit 112. The controller interface 114 may be connected to the controller 117 through wires or may be operably connected through transmission and receiving of wireless signals.

The controller 117 is configured with one or more controls, including but not limited to: joysticks, buttons, and movement sensors like accelerometers. A player manipulates the various controls and/or the controller, itself to create controller inputs which are interpreted by the processing unit 112 under controller rules provided by the game disc as actions within the game. Control inputs may comprise combinations of control manipulations performed simultaneously or in particular sequences. Moreover, actions may be related to other actions to form more complex actions when performed in particular relationships with each other.

A monitor 117 is also connected with the processor 112 through the bus 111. The processor 112 processes the game features and the controller inputs to resolve game action and creates a video of the game action. The video is sent to the monitor 117 through the bus 111 and displayed on the monitor 117 for the paler to view.

In an on-line version of the game, the console 110 is connected to a game server 150 through a network 140 and a network interface 115. The network 140 may be the Internet, an intranet or any other network suitable for providing communication between client consoles and a server. The network interface 115 may be an Ethernet card, or any other interface suitable for connecting to a network. The network interface is connected to the processing unit 112 through bus 111.

The server 150 comprises a processing unit 152. In the on-line version of the game, controller inputs are sent by the console 110 to the server 150, and the server processing unit 152 processes controller inputs and game features, and resolves actions. Video of the game action may be created at the server processing unit 152 or the console processing unit 112. The server processing unit 152 may be any suitable hardware, software, or combination thereof. According to one embodiment, the processing unit comprises one or more microprocessors.

The server may further comprise a memory 153 which may be internal to the server or may be an external memory device. The memory 153 is connected with the server processing unit 152 through a bus 151. A plurality of consoles 110, 120, 130 are connected to the server processing unit through a network 140 and a network interface 154 in the server 150.

According to one embodiment, a player who is playing a game on-line may choose to create a custom tutorial upon observing an action or a combination of actions on the players monitor 118. The actions may be performed by the player's own avatar or by an avatar of another on-line player. In this embodiment, the server saves the controller inputs for each player, at least temporarily. This may be accomplished, for example, by placing the controller inputs into a cache 157 which holds a rolling period of controller inputs or a rolling volume of controller inputs. For example, the cache may hold a volume of controller inputs that correspond to an average of ten minutes of game play. The cache 157 may be disposed in server memory 153 in console memory 113, or in a remote memory external to the server and the console.

A player may initiate the creation of a custom tutorial by executing a combination of controller manipulations upon seeing an action which the player would like to learn. The initiating controller manipulations may be a set combination or may be tied into an existing capability to interrupt a game and access one or more user interface controls, whereby the player may select from predefined choices or input parameters for the tutorial.

The player initiating the tutorial may be prompted through a user interface such as a menu or dialog box or the like to select parameters for the tutorial. The parameters may include, for example, selecting an avatar whose action the player would like to learn, and selecting a time period for the actions to be included in the tutorial. It should be understood that other parameters may also be prompted and selected, such as where to store the tutorial, whether or not to include video, how to display the controller inputs and the video, and other relevant parameters. Alternatively or additionally, one or more parameters may be set as user preferences. One or more parameters may be instead or additionally predefined or have default values programmed into the tutorial application.

A tutorial application 158 may capture controller inputs from the saved inputs in the cache 157 and create a tutorial from the captured controller inputs. The tutorial 158 may then be sent to a memory accessible to the player who created it. For example, the tutorial 158 may be saved in server memory 159, as illustrated in FIG. 1. Alternatively, the tutorial may be saved in console memory 113 or a remote memory not associated with the server 150 or console 110.

Figure 2:
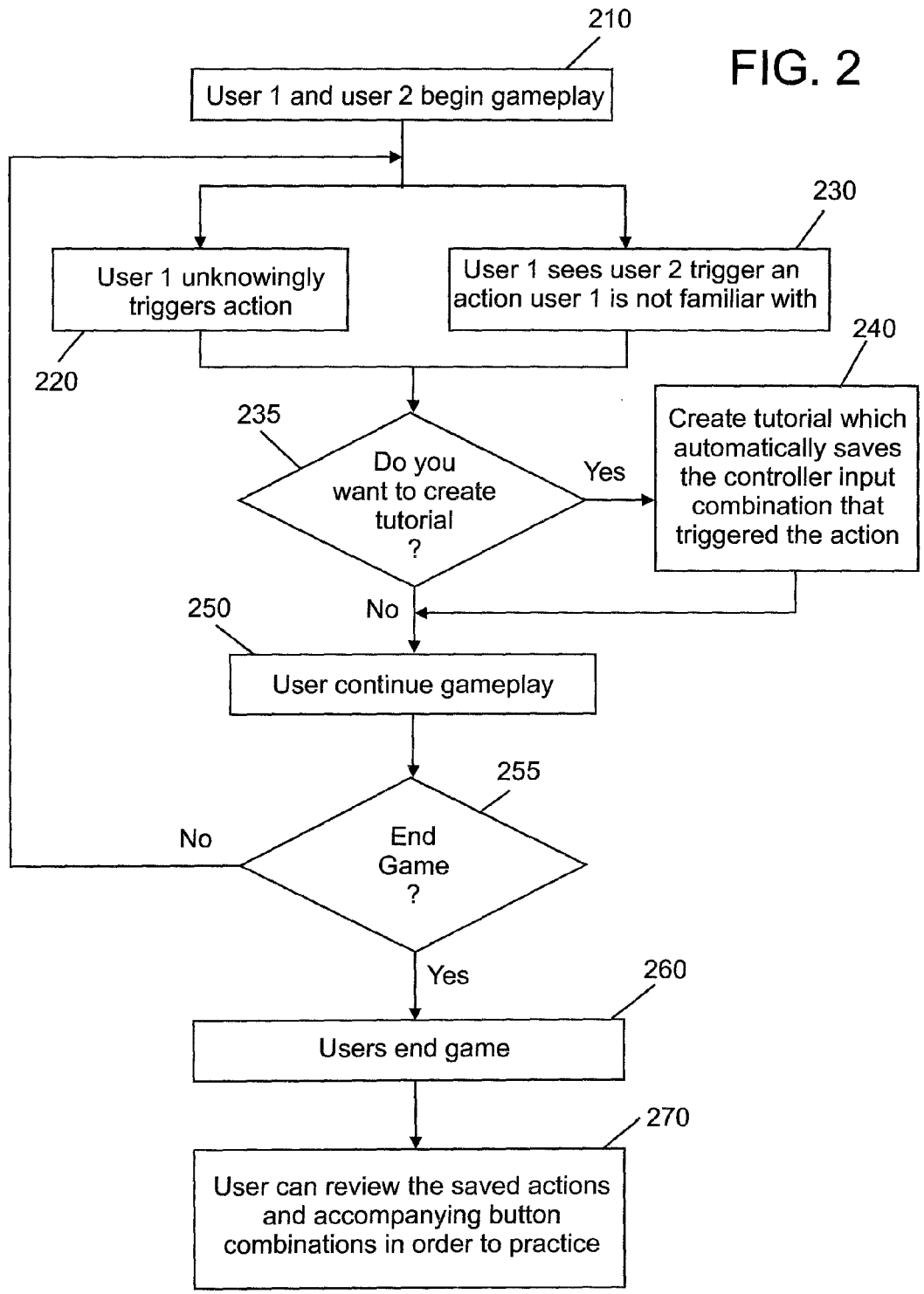
FIG. 2 is a flow diagram of a method for creating a custom tutorial for an interactive, multi-player game according to an embodiment of the present invention.

FIG. 2 is a flow diagram of a method for creating a custom tutorial for a video game according to one embodiment of the present invention. In the illustrated embodiment two players are playing a game on-line (step 210), although it should be understood that more than two players may play a game interactively on-line, and that one player may play alone on-line. Furthermore, as will be described below, a player may create a custom tutorial from interactive game play on a single console or from solo game play on a console.

During game play, the first player may unknowingly trigger an action (step 220). That is, the first player may inadvertently input a combination of controller manipulations that result in an action that the first player had not intended. When the first player sees the action of his/her avatar on his/her monitor 118, the first player may wonder how he/she triggered that action.

Upon seeing the action on that was inadvertently triggered on the monitor 118, the first player decides whether or not to create a tutorial to learn the controller manipulations that caused the action (step 235). If the first player decides to create a tutorial, he/she performs a controller manipulation to create a tutorial, which automatically saves the controller inputs that triggered the action (step 240). Then, the tutorial application 158 creates a tutorial which includes the controller inputs that triggered the chosen action, and the first user continues game play (step 250). If the first player does not create a tutorial, then the game play continues (step 250).

The first user may choose to create a tutorial in a variety of ways depending upon the configuration of the tutorial application 158 in step 240. A specific combination of controller inputs may be defined to initiate the creation of a tutorial. Alternatively, the tutorial application 158 may be configured to utilize an existing command to initiate a user interface session, such as a menu or a dialog box in which the application prompts the first user to provide the information necessary to define the tutorial. According to another alternative embodiment, the tutorial application may use pre-defined user preferences or default settings to create a tutorial having pre-set parameters.

During game play a first player may see a second player trigger an action that the first player is not familiar with (step 230). Again the first user may choose whether or not to create a tutorial to learn to trigger the observed action (step 235). If the first player chooses to create a tutorial, he/she performs a controller manipulation to create a tutorial. The controller inputs from the controller manipulation launch a tutorial application 158 according to one embodiment. The tutorial application 158 may prompt the first user to tag the avatar for whose action the first user wants to create a tutorial. Alternatively, the tutorial application may choose the avatar to tag based on user preferences or default criteria. The tutorial application 158 automatically saves the controller inputs that triggered the action of the tagged avatar (step 240). Then, the tutorial application 158 creates a tutorial which includes the controller inputs that triggered the chosen action, and the first user continues game play (step 250). If the first player does not create a tutorial, then the game play continues (step 250). According to one embodiment, the tutorial application may further save video of the action from the tagged avatar's perspective. The newly created custom tutorial is saved in a memory accessible to the first player. In one embodiment, the tutorial is saved in server memory 159, console memory 113, or in another memory, such as a third party memory.

As game play continues, a decision is made of whether or not to end game play (step 255). A player or players may decide to end game play and perform controller inputs that are pre-defined to end the game. Alternatively, game play may be ended by game rules, such as a defined play time or a defined objective in the game. If a decision is made to end the game, then the game ends (step 260). If mot, then game play continues.

After the game ends, the first player can access the tutorials that he/she made during game play in order to practice the controller inputs that trigger the chosen action (step 270).

FIG. 3 is a flow diagram of a method at a game server for creating a custom tutorial for an interactive, multi-player game according to an embodiment of the present invention. A stream of controller inputs is sent to the game server 150 by each console 110, 120, 130 in an on-line game. The game server 150 saves the controller inputs, at least temporarily (step 310). According to one embodiment, video of game action is also saved in step 310. Saving video may comprise saving video output that is sent to a console monitor 118, 128, 138 when the video is created by the game server. Alternatively, saving video may comprise saving resolution of actions that are sent to the individual consoles to create video.

The controller inputs and if appropriate the video output may be saved in server memory 153, such as in a cache that holds data for a limited time. The data may alternatively be saved in persistent storage for an entire game or even longer. The controller input and video data may instead be sent to the consoles 110, 120, 130 and stored in console memory 113, 123, 133 or to a third party location, such as a server of an independent service provider or web page that runs a tutorial application and creates custom tutorials.

A first player initiates tutorial creation (step 320). According to one embodiment, this step also includes the first player indicates the avatar performing the chosen action. The player may initiate tutorial creation by launching a tutorial application 158. This may be accomplished by performing a pre-defined combination of controller manipulations recognizable by the game server 150, for example. Alternatively, the tutorial application 158 may be launched from a user interface, such as a menu or dialog box that is built into the game and opened by a pre-defined course of action by the first player. The tutorial application may prompt the first player to indicate an avatar, or an avatar may be selected based on previously set user preferences or default settings, using factors such as proximity to the first user's avatar, selecting the most advanced action performed in the last thirty seconds, and the like.

In response to a player performing an action to create a tutorial and indicating a user's avatar during interactive game play, the tutorial application 158 tags the player with the indicated avatar (step 330). The first player may be prompted to select an avatar to be tagged, as described above. This may be accomplished by showing controller input designations over each avatar within a defined proximity to the first user's avatar, for example. It should be understood that it is desirable to provide the necessary inputs for creating a tutorial as quickly as possible so that the first player can resume game play. It should also be understood that the first player may tag his/her own avatar.

The tutorial application 158 sets parameters for the tutorial (step 340). Tutorial parameters may include, for example, the period of time to back and capture controller inputs, whether or not to capture or create video to correspond with the chosen action, where to save the tutorial that is created, and any other parameters necessary to create and provide a custom tutorial. The tutorial application may set parameters by prompting selections from the first player or by applying user preferences or default parameters.

The tutorial application 158 captures controller inputs from the tagged player corresponding to the chosen action (step 350). This may be accomplished, for example, by searching a cache 157 where the controller inputs were stored and saving the controller inputs from the tagged player over a defined time into a tutorial file 159.

The tutorial application 158 may also capture video corresponding to the chosen action (step 360). As previously described, the video may be a streaming video of game action from the game server 150 to the consoles 110, 120, 130. Alternatively, the video may be a stream of data comprising resolution of game action usable to create a video by a game console 110, 120, 130.

The tutorial application 158 then creates a custom tutorial for performing game actions performed by the tagged user's avatar comprising the captured controller inputs and, if applicable video of game action (step 370). The tutorial may comprise an image of a controller 117, 127, 137 with manipulations corresponding to the controller inputs saved in the tutorial. The manipulated controls may be shown in a different color or other highlighting to emphasize the controller manipulations. Alternatively, codes for the controller manipulations may scroll on the monitor 117, such as "L" for a left button, "A" for an A button, and the like. Video may be shown with the controller manipulations to enhance the training effectiveness of the tutorial.

The tutorial application 158 sends the custom tutorial to a memory device accessible by the first user (step 380).

While embodiments of the present invention have been illustrated and described in which the tutorial application 158 is encoded in memory 153 at the server 150, and the controller inputs are stored and captured at the server 150, it should be understood by those skilled in the art that the tutorial application 158 could be encoded on memory at a console 110, 120, 130 and used to create tutorials of actions in games that that are not played on-line, or for creating tutorials for on-line actions by a player on the same console as the first player. Alternatively, the tutorial application may be encoded on a remote server or web page with access to the stream of controller inputs.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system or device. For the purposes of this description, a computer-usable or computer readable medium may be any apparatus that can contain or store the program for use by or in connection with the instruction execution system, apparatus, or device.

The foregoing method may be realized by a program product comprising a machine-readable medium having a machine-executable program of instructions, which when executed by a machine, such as a computer, performs the steps of the method. This program product may be stored on any of a variety of known machine-readable medium, including but not limited to compact discs, floppy discs, USB memory devices, and the like.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk an optical disk. Current examples of optical disks include compact disk-read only memory (CD-ROM), compact disk-read/write (CD-R/W) and DVD.

The preceding description and accompanying drawing are intended to be illustrative and not limiting of the invention. The scope of the invention is intended to encompass equivalent variations and configurations to the full extent of the following claims.

What is claimed is:

1. A method for creating a custom tutorial for a video game, comprising the steps of:
   saving controller inputs during game play;
   in response to a first player performing an action at a time selected by the first player while the first player is playing the video game, tagging a selected player in the video game;
   capturing controller inputs performed by the tagged player during a period of time preceding the action by the first user;
   creating a custom tutorial for performing game actions performed by the tagged player's avatar during the period of time preceding the action comprising the captured controller inputs; and
   sending the custom tutorial to a memory device accessible by the first player.

2. The method of claim 1, wherein the first player indicates a player to be tagged, and the tagged player is the first player.

3. The method of claim 1, wherein the first player indicates a player to be tagged, and the tagged player is a second player.

4. The method of claim 3, wherein the game play comprises playing an interactive video game with other players over a network.

5. The method of claim 1, further comprising the steps of saving video of game play; and capturing a video of game action from the tagged player's perspective; wherein the step of creating a custom tutorial further comprises synchronizing the controller inputs and the game action video; and wherein the custom tutorial comprises the controller inputs and the video.

6. The method of claim 4 wherein saving controller inputs comprises placing them in a cache which holds the controller inputs for a rolling period of time.

7. The method of claim 1, wherein creating a custom tutorial further comprises specifying the period of time prior to the tagging action to create the tutorial to include in the tutorial.

8. A system for creating a custom tutorial for a video game, comprising:
- a controller having controls, the controller sending controller inputs to a processor in response to manipulation of the controls;
- a processor operably connected to the controller processing controller inputs and game features into game action and creating video of the game action;
- a memory operably connected to the processor storing controller inputs; and
- a memory having a tutorial application encoded thereon, the tutorial application tagging a player in the video game selected by a first user in response to the first user performing an action while the first player is playing the video game, capturing controller input performed by the tagged player during a period of time preceding the action by the first user, and creating a tutorial comprising the captured controller inputs.

9. The system of claim 8, wherein the processor is disposed in a game console.

10. The system of claim 8, wherein the processor is disposed in a game server connected with a plurality of game consoles for interactive on-line game play.

11. The system of claim 8 wherein the tagged game player is the first game player.

12. The system of claim 8 wherein the tagged game player is a second game player.

13. The system of claim 8 wherein the tutorial application captures video of game action and the tutorial comprises the captured video.

14. The system of claim 8 wherein the tutorial application enables the first player to select the period of time prior to the action to create the tutorial to include in the tutorial.

15. A computer program product comprising a computer readable storage medium having encoded thereon a program of instructions, comprising:
- program instructions for saving controller inputs during game play;
- program instructions for tagging a selected player in the video game in response to a first player performing an action at a time selected by the first player while the first player is playing the video game:
- program instructions for capturing controller inputs performed by the tagged player during a period of time preceding the action by the first user;
- program instructions for creating a custom tutorial for performing game actions performed by the tagged player's avatar during the period of time preceding the action comprising the captured controller inputs; and
- program instructions for sending the custom tutorial to a memory device accessible by the first player.

16. The computer program product of claim 15, wherein the tagged player is not the first player.

17. The computer program product of claim 15 wherein the program of instruction further comprises program instructions for saving video during game play; and program instructions for capturing video corresponding to the captured controller inputs and wherein the tutorial comprises the captured video.

18. The computer program product of claim 15 wherein the program of instruction further comprises program instructions for specifying a period of time prior to the action to create the tutorial to include in the tutorial.

* * * * *